No. 657,977. Patented Sept. 18, 1900.
O. J. ZIEGLER.
WINDMILL.
(Application filed May 29, 1900.)

(No Model.) 2 Sheets—Sheet 1.

Witnesses, Inventor,
Oscar J. Ziegler.
By W. W. Morrison,
Atty.

No. 657,977. Patented Sept. 18, 1900.
O. J. ZIEGLER.
WINDMILL.
(Application filed May 29, 1900.)

(No Model.) 2 Sheets—Sheet 2.

Witnesses, Inventor,
Oscar J. Ziegler.
By L. L. Morrison,
Atty.

UNITED STATES PATENT OFFICE.

OSCAR J. ZIEGLER, OF FREEPORT, ILLINOIS, ASSIGNOR TO THE STOVER MANUFACTURING COMPANY, OF SAME PLACE.

WINDMILL.

SPECIFICATION forming part of Letters Patent No. 657,977, dated September 18, 1900.

Application filed May 29, 1900. Serial No. 18,473. (No model.)

*To all whom it may concern:*

Be it known that I, OSCAR J. ZIEGLER, a citizen of the United States of America, residing at Freeport, in the county of Stephenson and State of Illinois, have invented certain new and useful Improvements in Windmills, of which the following is a specification, reference being had therein to the accompanying drawings.

This invention relates to improvements in windmills; and it consists, essentially, of an organization involving two pinions mounted on a driving-shaft, two spur-wheels concentrically mounted on separate shafts, meshing with the pinions and provided with a wrist-pin connection, a semiwalking-beam, and a pitman connecting the semiwalking-beam with the wrist-pin connection of the spur-wheels. The construction and arrangement of parts herein shown and described result in the production of a compact machine of great strength, none of the component parts whereof is at any time subjected to oblique strains or to friction resulting from such strains, as is the case in every windmill mechanism employing a single-train gear organization and a pitman connecting a wrist-pin thereon with a reciprocatory actuating-rod.

Figure 1:
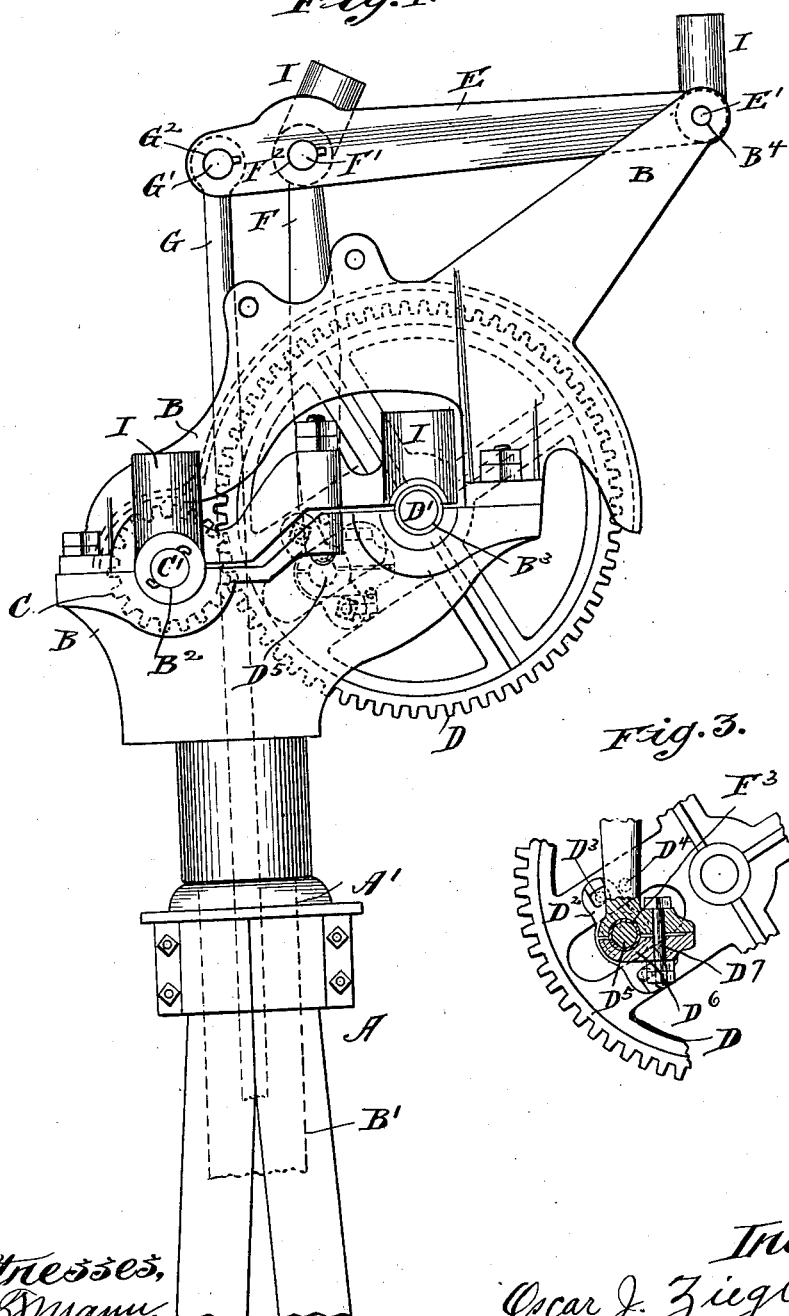
Figure 3:
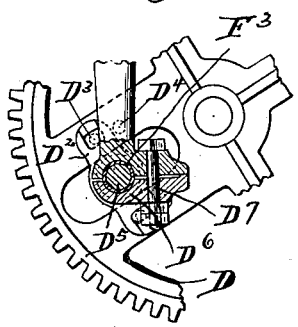
Figure 2:
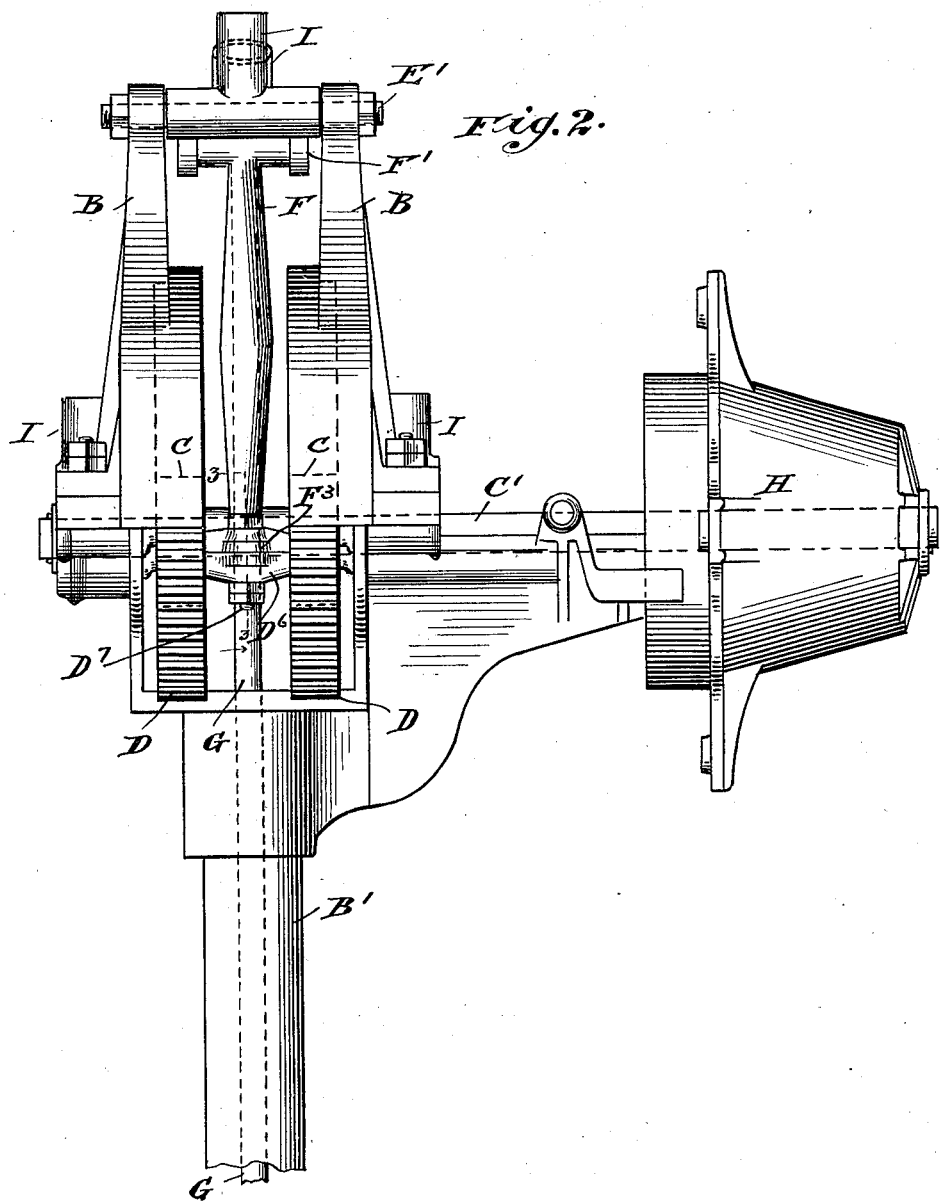

In the accompanying drawings, forming a part of this specification, and on which like letters of reference indicate corresponding parts throughout the several views, Figure 1 is a side elevation of a windmill embodying my improved organization. Fig. 2 is a front elevation of the same. Fig. 3 shows a section on the line 3 3 in Fig. 2 of parts there shown and a fragment of a spur-wheel.

A is the apex portion of a windmill-tower, having a circular opening A' therein.

B is a cast frame for supporting the operative parts of the windmill and is provided with a circular tubular stem B', projecting downward through the circular opening A' in the part A, wherein it is rotatable.

$B^2$ $B^3$ $B^4$ are bearings in the frame B.

C shows two pinions mounted on the driving-shaft C' in the bearings $B^2$ in the frame B.

D shows two spur-wheels concentrically mounted on separate shafts D' in the bearings $B^3$, meshing with the pinions C and provided with a wrist-pin connection, which is here shown as consisting of two connecting-plates $D^2$, secured to the spur-wheels D by means of bolts $D^3$, inserted therethrough and through bolt-holes $D^4$ in the spur-wheels, and a wrist-pin $D^5$, passed through and rigidly connected with such plates $D^2$.

E is a semiwalking-beam pivot-jointed by one end by means of the pintle E' and bearing $B^4$ to the frame B.

F is a pitman connecting the semiwalking-beam E, through the pintle F' and bearing $F^2$ therein, with the wrist-pin $D^5$ of the wrist-pin connection of the spur-wheels D, through the bearing $F^3$ therein, and the cap $D^6$, secured thereto by means of the connecting-bolt $D^7$.

G is a pump-rod pivoted to the free end of the semiwalking-beam E by means of the pintle G' and bearing $G^2$ therein.

H is the hub of the wind-wheel (not shown) of the mill.

I shows grease-boxes.

Power, supplied by the wind-wheel of the mill, is communicated through the driving-shaft C', pinions C, spur-wheels D, pitman F, and semiwalking-beam E to the pump-rod G, which is thereby longitudinally reciprocated for the purpose of pumping water or for any other desired purpose.

Having fully described my invention, what I claim as new, and desire to secure by Letters Patent, is—

In a windmill, in combination, two pinions mounted on a driving-shaft, two spur-wheels concentrically mounted on separate shafts— meshing with the pinions and provided with a wrist-pin connection, a walking-beam, a pitman connecting the walking-beam with the wrist-pin connection of the spur-wheels, a pump-rod pivoted to the free end of the walking-beam, the longitudinal axes of the pitman, walking-beam and pump-rod lying in a vertical plane parallel with, and substantially midway between, the spur-wheels and pinions, substantially as and for the purpose specified.

In testimony whereof I affix my signature in the presence of two witnesses.

OSCAR J. ZIEGLER.

Witnesses:
L. HUGHES,
JAS. W. DUNLOP.